US006752398B1

(12) United States Patent
McArthy

(10) Patent No.: US 6,752,398 B1
(45) Date of Patent: Jun. 22, 2004

(54) VALVE STEM SEAL ASSEMBLY

(75) Inventor: Troy D. McArthy, Auburn, IN (US)

(73) Assignee: Dana Corporation, Ottawa Lake, MI (US)

(*) Notice: Subject to any disclaimer, the term of this patent is extended or adjusted under 35 U.S.C. 154(b) by 8 days.

(21) Appl. No.: 10/308,696

(22) Filed: Dec. 2, 2002

(51) Int. Cl.[7] .......................... F02F 11/00; F16J 15/32; F02N 3/00

(52) U.S. Cl. .................... 277/502; 277/551; 123/188.8; 123/188.9

(58) Field of Search ......................... 277/502, 551–552, 277/500, 576–577, 359–360; 123/188.8, 188.9

(56) References Cited

U.S. PATENT DOCUMENTS 3,326,562 A * 6/1967 Deuring ...................... 277/502
3,575,328 A * 4/1971 Jespersen et al. .............. 225/2
4,189,033 A * 2/1980 Katsumori .................. 188/269
4,826,180 A * 5/1989 Deuring ...................... 277/502
4,928,644 A * 5/1990 Travis ..................... 123/188.6
5,558,056 A * 9/1996 Sakata ..................... 123/188.6
6,230,679 B1 * 5/2001 Hegernier et al. ..... 123/190.17
6,244,235 B1 * 6/2001 Hegemier et al. ....... 123/188.6
6,516,769 B2 * 2/2003 McArthy ................ 123/188.6

* cited by examiner

*Primary Examiner*—Anthony Knight
*Assistant Examiner*—Vishal Patel
(74) *Attorney, Agent, or Firm*—Rader, Fishman & Grauer PLLC

(57) ABSTRACT

A valve stem seal assembly incorporates a cylindrical retainer having an axis and an upper end about which symmetrically and circumferentially arranged, alternating first and second sets of fingers have radially inwardly depending upper ends. The first set of fingers is generally parallel to the axis and the upper ends are generally perpendicular to the axis to engage a first exterior annular groove of an elastomeric seal body. The first set of fingers provides for axial attachment of the seal body to a top of a valve guide. The second set of fingers is generally arcuate and the upper ends extend radially inwardly to engage a second exterior annular groove of the seal body. The second set of fingers eliminates the need for a garter spring used by traditional valve stem seal assemblies by generating a force to urge the sealing lip against a reciprocating valve stem.

18 Claims, 3 Drawing Sheets

VALVE STEM SEAL ASSEMBLY

RELATED APPLICATIONS

The present invention is related to U.S. patent application Ser. No. 09/792,971 filed on Feb. 26, 2001, the entire contents of which are herein incorporated by reference.

TECHNICAL FIELD

The present invention relates to a valve stem seal assemblies for use in internal combustion engines and in particular to sealing media retainers for such seal assemblies.

BACKGROUND OF THE INVENTION

Those skilled in the art will appreciate the manner in which intake and exhaust valves are employed in cylinder heads of internal combustion engines. Such valves, supported for reciprocal motion within valve guides, include integral elongated valve stems extending away from the engine cylinder heads. The ends of the valve stems interact with rotating cams for cyclic repeated opening and closing of the valves against the force of valve return springs during a combustion cycle. Obviously, in order to permit unobstructed reciprocal movement of the valve stem in the valve guide, some mechanical clearance must exist between the valve guide and the moving valve stem. The valve stems thus move reciprocally to and from the cylinder head, each within its individual valve guide, and so-called valve stem seal assemblies are used to seal against leakage of oil through a clearance path between each annular engine valve guide and its associated valve stem.

Thus, as is well known, the intake port of a combustion chamber is opened and closed by the reciprocating motion of at least one intake valve, which in turn is driven by the rotary motion of a cam, the latter being affixed to and rotatable with an engine camshaft. The intake valve permits fuel mixed with air to flow into the combustion chamber. In addition, an internal combustion engine has at least one exhaust valve and associated exhaust port for releasing expended combustion gases to the atmosphere. Typically, intake and exhaust valves are of similar construction and both include valve stems integrally affixed to the valves.

In the typical engine, a valve stem seal assembly is fitted over or atop each valve guide, wherein each assembly has a retainer frictionally mounted to an associated valve guide, or is retained in place via cooperation of a return spring and a retainer flange, to assure attachment of the valve stem seal assembly within the engine. Typically each valve stem seal assembly has two primary parts; 1) an elastomeric oil seal positioned at one end to control leakage of oil between the valve stem and the valve guide, and 2) a structural cylindrical part called a retainer mounted atop of the valve guide. In many cases, the retainer has a so-called bottom flange that extends circumferentially about the bottom of the valve guide for supporting the retainer on the cylinder head deck. Additionally, traditionally manufactured elastomeric oil seals include an exterior groove for receiving a “garter spring” as described below.

Much progress has been achieved in the art of valve stem seal assembly design and construction. However, several design issues remain problematic for traditional valve stem seal assemblies. For example, the number of parts associated with a valve stem seal assembly has typically been the seal body and the retainer. However, a third part, called a “garter spring” is often disposed within a circumferential groove about the exterior of the seal body to impart a hoop stress or force to engage the seal body with the valve stem and prevent leakage of oil. The garter spring is typically made of metal and adds additional cost to the seal body assembly. An additional difficulty with traditional seal assemblies is verification of proper installation. Use of the garter spring with the retainer requires separate verification for each part. This additional verification also adds to the cost of the seal body assembly.

SUMMARY OF THE INVENTION

The inventors of the present invention have recognized these and other problems associated with traditional valve stem seal assemblies. To this end, the inventors have developed an improved valve stem seal assembly that eliminates the need for an additional garter spring while still securing a seal body to a top of a valve guide and engaging a valve stem.

Specifically, the invention is a valve stem seal assembly adapted for installation atop a valve guide of an internal combustion engine for sealingly engaging a valve stem reciprocally moveable through the valve guide. The valve stem seal assembly comprises a resilient annular seal body defining an interior annular sealing lip adapted to engage the valve stem and further including first and second exterior annular grooves. The assembly also comprises a retainer defining a generally rigid cylindrical body with upper and lower body ends and further defining an axis. Furthermore, the assembly includes a first set of fingers disposed from the lower body end to the upper body end of the retainer. The first set of fingers comprises radially inwardly depending upper ends at the upper body end of the retainer for engaging the first exterior annular groove of the seal body to maintain the seal body axially against the top surface of the valve guide. Additionally, a second set of fingers is disposed between the lower body end and the upper body end of the retainer. The second set of finger comprises radially inwardly depending upper ends for engaging the second exterior annular groove of the seal body to impart a circumferential force urging the sealing lip against of the reciprocally moveable valve stem.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
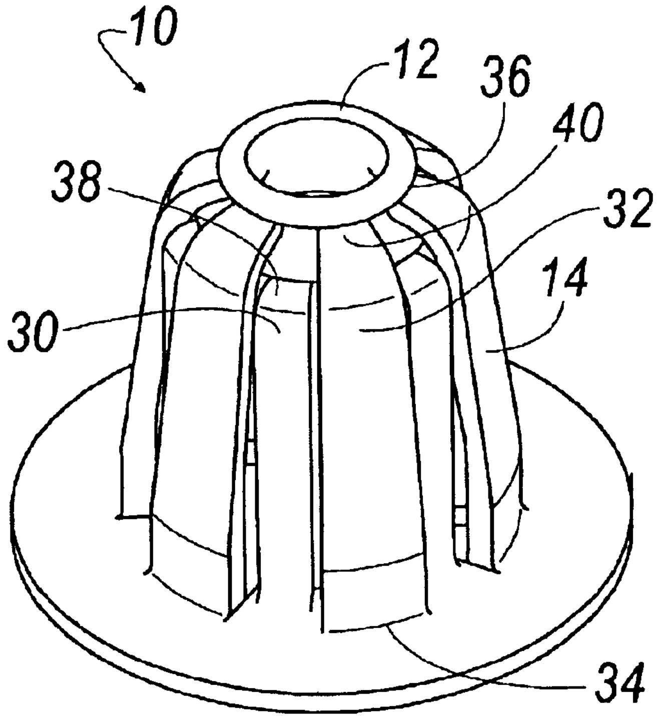
FIG. 1 is a perspective view of the valve stem seal assembly of the present invention.
Figure 6:
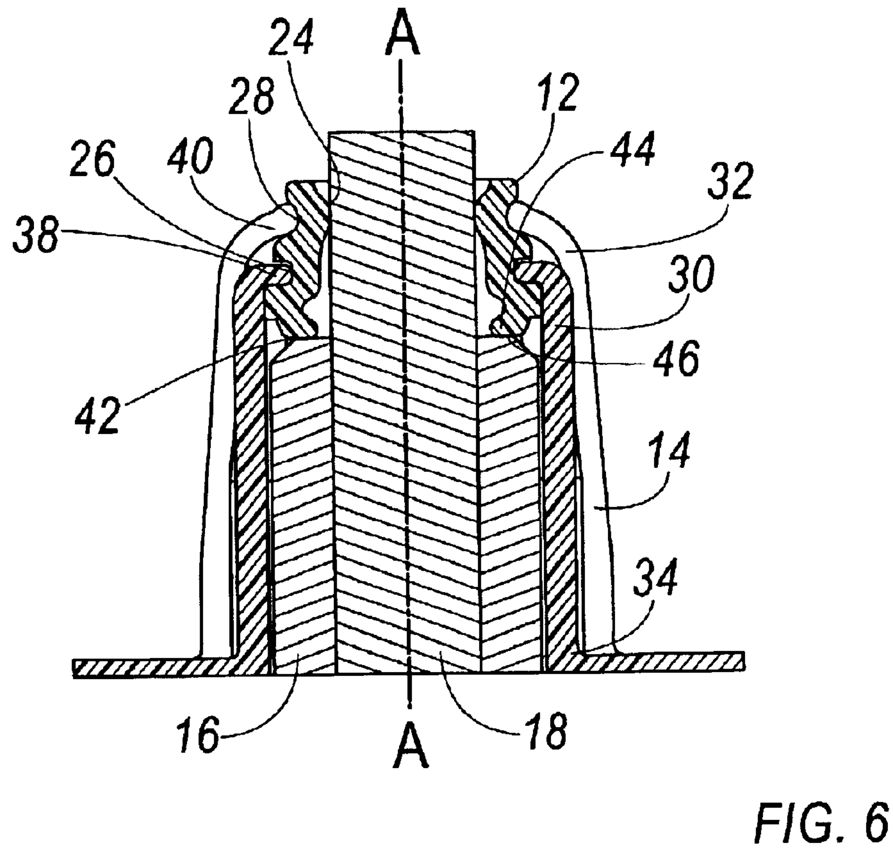
FIG. 6 is an identical cross-sectional view of the valve stem seal assembly of FIG. 5, shown however in sealing engagement with a valve stem in accordance with the contemplated usage of the present invention in an internal combustion engine, and particularly showing the valve stem seal assembly supported atop a valve guide through which the valve stem is reciprocally moveable.

Referring initially to FIG. 1, a valve stem seal assembly 10 is constructed to includes a resilient elastomeric seal body 12 supported in a rigid cylindrical retainer 14 having an axis A—A. As best seen in FIG. 6, an internal combustion engine (not shown) includes a valve guide 16 with a central opening therethrough. The opening receives a reciprocating valve stem 18. To prevent the escape of oil, the valve stem seal assembly 10 is positioned over the valve guide 16 and engages the valve stem 18.

Figure 2:
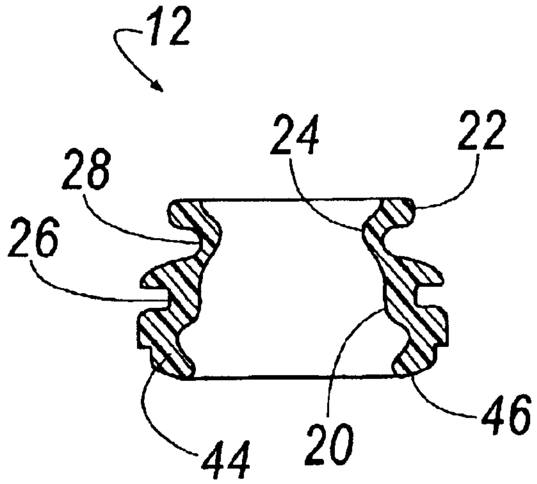
FIG. 2 is a cross-sectional view of a resilient elastomeric seal body of the valve stem seal assembly of FIG. 1, depicting particular construction details of the seal body.

The resilient seal body 12, as best shown in FIG. 2, is generally annular in shape and includes interior and exterior surfaces 20 and 22, respectively. Within its interior surface 20, the seal body 12 incorporates a circumferentially extending sealing lip 24 for contacting the reciprocally moving valve stem 18 and preventing leakage of oil. As shown in the preferred embodiment, the seal body 12 may have only one sealing lip 24, but one skilled in the art is aware of the advantages of having multiple sealing lips engaging the valve stem 18. Furthermore, the exterior surface 22 of the seal body 12 includes a first exterior annular groove 26 and a second exterior annular groove 28. The grooves 26, 28 of the seal body 12 are axially offset from each other along the axis A—A with the second groove 28 being positioned higher than the first groove 26.

Figure 5:
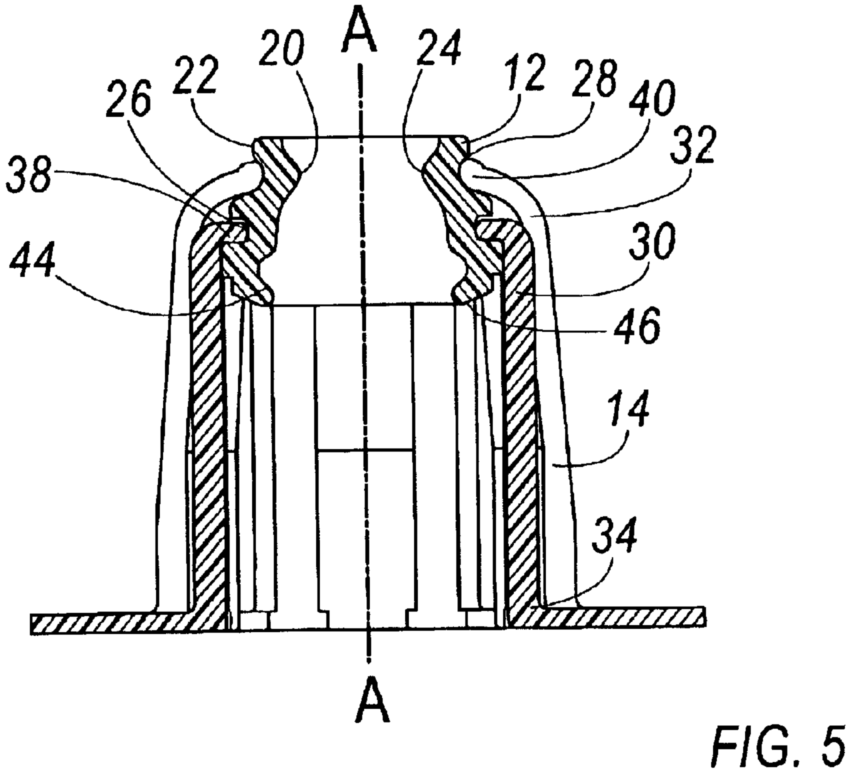
FIG. 5 is a cut-away view of the valve stem seal assembly as depicted in FIG. 1, revealing cross-sectional views of the connective relationship between the elastomeric seal body and the metallic retainer.

The seal body 12 is supported atop the valve guide 16 and contacts the valve stem 18 by the retainer 14. The retainer 14 is generally rigid and is typically made from a metallic or plastic material depending upon the rigidity and heat characteristics needed as a result of engine demand. The retainer 14 includes a first set of fingers 30 and a second set of fingers 32 extending from a lower body end 34 to an upper body end 36 of the retainer 14. The first and second sets of finger 30, 32 each include upper ends 38, 40 respectively. The upper ends 38, 40 are positioned at the upper body end 36 of the retainer 14 and extend radially inwardly to engage the grooves 26, 28 of the seal body 12. As best seen in FIG. 5, the upper ends 38 of the first set of fingers 30 engage the first exterior annular groove 26, while the upper ends 40 of the second set of fingers 32 engage the second exterior annular groove 28. Accordingly, because the grooves 26, 28 are axially offset, the first and second sets of fingers 30, 32 are of different lengths with the second set of fingers 32 preferably generally longer than the first set of fingers 30.

Figure 4:
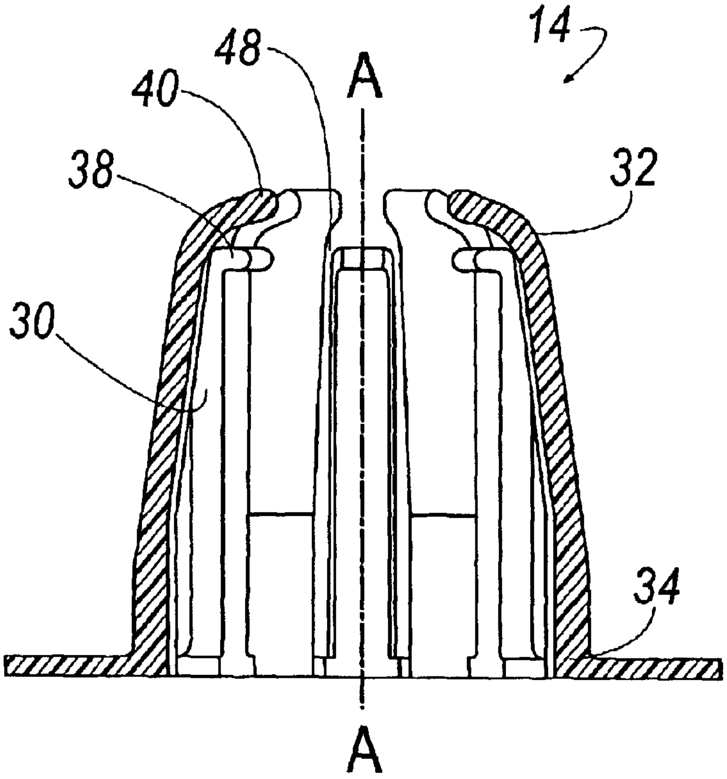
FIG. 4 is a cross-sectional view of a retainer along lines 4—4 of FIG. 3, depicting dual sets of fingers as employed in the valve stem seal assembly of the present invention.

The upper ends 38 of the first set of fingers 30 engage the first groove 26 to maintain the seal body 12 axially against a top surface 42 of the valve guide 16. The seal body 12 includes a lower circumferential flange 44 having a bottom surface 46. The bottom surface 46 of the seal body 12 contacts the top surface 42 of the valve guide 16. The first set of fingers 30 in the first groove 26 exerts an inward and downward force upon the seal body 12 to maintain contact between the bottom surface 46 of the seal body 12 and the top surface 42 of the valve guide 16. In accordance with the present invention, the first set of fingers 30 is generally parallel to the axis A—A of the retainer 14. The upper ends 38 of the first set of fingers 30 are turned radially inward and are generally perpendicular to the axis A—A of the retainer 14. Although shown in FIG. 4 and described as a z-shape configuration, the z-shape configuration of the first set of fingers 30 is only a preferred embodiment and one skilled in the art may contemplate an alternative shape to achieve the result of maintaining the seal body 12 axially against the top surface 42 of the valve guide 16.

The upper ends 40 of the second set of fingers 32 engage the second groove 28 to impart a circumferential force to the sealing lip 24 of the seal body 12. The circumferential force urges the sealing lip 24 against the reciprocally moveable valve stem 18, thereby providing a seal between the scaling lip 24 of the seal body 12 and the reciprocally moveable valve stem 18 to prevent the leakage of oil. The circumferential force generated by the second set of fingers 32 eliminates the need for a "garter spring" thereby reducing the quantity of parts and improving assembly verification techniques. In accordance with the present invention, the second set of fingers 32 is generally arcuate over the length of the fingers 32. The arcuate bend helps to engage the upper ends 38 of the second set of fingers 32 in the second groove 28 thereby axially offsetting the upper ends 38,40 of the sets of fingers 30, 32. As described above, because the grooves 26, 28 are axially offset, the second set of fingers 32 is a different length than the first set of fingers 30. As a result of the difference in length between the first and second set of fingers 30, 32, the bending strain is more evenly distributed over a larger area of the seal body 12. Accordingly, a more stable circumferential force is applied to the sealing lip 24 of the seal body 12 under varying engine heat cycles. Furthermore, to adjust the amount of circumferential force applied to the sealing lip 24 of the seal body 12, the arcuate bend can be adjusted during design and manufacture of the valve stem seal assembly 10. Therefore, the arcuate bend of the second set of fingers 32 provides a more flexible design that is more suitably adapted for different vehicles and engines. Again, as described and shown in the figures, the second set of fingers is generally arcuate, however, the arcuate shape is only a preferred embodiment and one skilled in the art may contemplate an alternative design that achieves the resulting circumferential force applied to the sealing lip 24 of the seal body 12.

Figure 3:
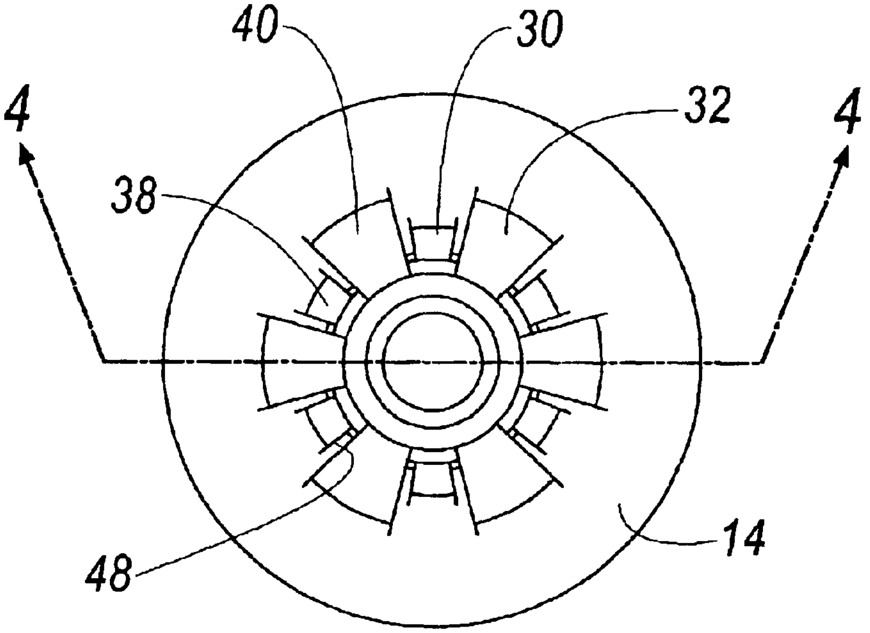
FIG. 3 is a top view of the retainer of the present invention revealing particular construction details of the two sets of alternating fingers.

It will also be appreciated by those skilled in the art that manufacture of the retainer 14 can be achieved in a variety of ways. Referring to FIG. 3, it is apparent that the first set of fingers 30 and second set of fingers 32 are circumferentially and symmetrically arranged about the axis A—A of the retainer 14. In the embodiments herein described it is, however, preferable that the fingers of each set 30, 32 have circumferential spacing or gaps 48 between them. The gaps 48 are for the purpose of avoiding frictional interference between movements of adjacent fingers of sets 30, 32 during the working or useful life of the valve stem seal assembly 10. The gaps 48 can be of a relatively small order of magnitude, as will be appreciated by those skilled in the art. In addition, this invention will accommodate other circumferential arrangements of the fingers of each set 30, 32. Thus, for example, the fingers of each set 30, 32 could be arranged so that there are two fingers of the first set 30 positioned side-by-side followed by two fingers of the second set 32 side-by-side. Such modified arrangement as well as others are deemed herein to be feasible, notwithstanding the described preferred embodiment which provides the circumferentially alternating arrangement wherein each finger of the first set 30 is bordered on each side by a finger of the second set 32, as depicted in the Figures. Furthermore, in a preferred arrangement, the first and second sets of fingers 30, 31 are radially offset from each other about the axis of the retainer 14.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A valve stem seal assembly adapted for installation atop of a valve guide of an internal combustion engine for sealingly engaging a valve stem reciprocally moveable through the valve guide, the seal assembly comprising:

a resilient annular seal body defining an interior annular sealing lip adapted to engage the valve stem and further including a first exterior annular groove and a second exterior annular groove;

a retainer defining a generally rigid cylindrical body having an axis and including an upper body end and a lower body end;

a first set of fingers disposed from said lower body end of said retainer and comprising radially inwardly depending upper ends for engaging said first exterior annular groove of said seal body to maintain said seal body axially against a top surface of the valve guide; and a second set of fingers disposed from said lower body end of said retainer and comprising radially inwardly depending upper ends for engaging said second exterior annular groove of said seal body to impart a circumferential force to said sealing lip and to urge said sealing lip against the reciprocally moveable valve stem.

2. The valve stem seal assembly, as in claim 1, wherein said second set of fingers has a different length than said first set of fingers.

3. The valve stem seal assembly, as in claim 1, wherein said first set of fingers are generally parallel to said axis of said retainer and said upper ends of said first set of fingers are generally perpendicular to said axis for engaging said first exterior annular groove of said seal body.

4. The valve stem seal assembly, as in claim 1, wherein said second set of fingers are generally arcuate over the length of the fingers resulting in said upper ends of said second set of fingers engaging said second exterior annular groove of said seal body.

5. The valve stem seal assembly, as in claim 1, wherein said seal body further comprises a lower circumferential flange defining a bottom surface adapted to sealing engage the top surface of the valve guide.

6. The valve stem seal assembly, as in claim 1, wherein said first and second sets of fingers are circumferentially alternating, such that each finger of said first set of fingers is bordered on each side by one finger of said second set of fingers.

7. The valve stem seal assembly, as in claim 1, wherein said first and second sets of fingers are circumferentially and symmetrically arranged about said axis of said retainer.

8. The valve stem seal assembly, as in claim 1, wherein said upper ends of said first and second sets of fingers are axially offset from each other.

9. A valve stem seal assembly adapted for installation atop of a valve guide of an internal combustion engine for sealingly engaging a valve stem reciprocally moveable through the valve guide, the seal assembly comprising:

a retainer defining a generally rigid cylindrical body having an axis and including an upper body end and a lower body end;

a resilient annular seal body defining an interior annular sealing lip adapted to engage the valve stem and further including a first exterior annular groove and a second exterior annular groove wherein said first exterior annular groove and said second exterior annular groove are axially offset;

a first set of fingers disposed from said lower body end of said retainer and comprising radially inwardly depending upper ends for engaging said first exterior annular groove of said seal body to maintain said seal body axially against a top surface of the valve guide; and a second set of fingers disposed from said lower body end of said retainer and comprising radially inwardly depending upper ends for engaging said second exterior annular groove of said seal body to impart a circumferential force to said sealing lip and to urge said sealing lip against the reciprocally moveable valve stem.

10. The valve stem seal assembly, as in claim 9, wherein said second set of fingers has a different length than said first set of fingers.

11. The valve stem seal assembly, as in claim 9, wherein said first set of fingers are generally parallel to said axis of said retainer and said upper ends of said first set of fingers are generally perpendicular to said axis for engaging said first exterior annular groove of said seal body.

12. The valve stem seal assembly, as in claim 9, wherein said second set of fingers are generally arcuate over the length of the fingers for adjusting said circumferential force applied to the sealing lip.

13. The valve stem seal assembly, as in claim 9, wherein said seal body further comprises a lower circumferential flange defining a bottom surface adapted to sealing engage the top surface of the valve guide.

14. The valve stem seal assembly, as in claim 9, wherein said first and second sets of fingers are circumferentially and symmetrically arranged about said axis of said retainer.

15. The valve stem seal assembly, as in claim 9, wherein said first and second sets of fingers are circumferentially alternating, such that each finger of said first set of fingers is bordered on each side by one finger of said second set of fingers.

16. The valve stem seal assembly, as in claim 9, wherein said upper ends of said first and second sets of fingers are axially offset from each other.

17. The valve stem seal assembly, as in claim 9, wherein said first set of fingers and said second set of fingers are radially offset from each other about said axis of said retainer.

18. A valve stem seal assembly adapted for installation atop of a valve guide of an internal combustion engine for sealingly engaging a valve stem reciprocally moveable through the valve guide, the seal assembly comprising:

a retainer defining a generally rigid cylindrical body having an axis and including an upper body end and a lower body end;

a resilient annular seal body defining an interior annular sealing lip adapted to engage the valve stem and further including a first exterior annular groove and a second exterior annular groove wherein said first exterior annular groove and said second exterior annular groove are axially offset;

a first set of fingers disposed from said lower body end of said retainer and comprising radially inwardly depending upper ends for engaging said first exterior annular groove of said seal body to maintain said seal body axially against a top surface of the valve guide; and a second set of fingers disposed from said lower body end of said retainer and radially offset from said first set of fingers about said axis of said retainer and further comprising radially inwardly depending upper ends for engaging said second exterior annular groove of said seal body to impart a circumferential force to said sealing lip and to urge said sealing lip against the reciprocally moveable valve stem.

* * * * *